(12) United States Patent
Marchi et al.

(10) Patent No.: US 9,770,131 B2
(45) Date of Patent: Sep. 26, 2017

(54) BEVERAGE PRODUCING MACHINE WITH A CONNECTOR FOR A REMOVABLE INGREDIENT CONTAINER

(71) Applicants: KONINKLIJKE PHILIPS N.V., Eindhoven (NL); KONINKLIJKE DOUWE EGBERTS B.V., Utrecht (NL)

(72) Inventors: Marco Marchi, Eindhoven (NL); Cesare Lenzi, Eindhoven (NL)

(73) Assignees: KONINKLIJKE PHILIPS N.V., Eindhoven (NL); KONINKLIJKE DOUWE EGBERTS B.V., Utrecht (NL)

( * ) Notice: Subject to any disclaimer, the term of this patent is extended or adjusted under 35 U.S.C. 154(b) by 331 days.

(21) Appl. No.: 14/429,402

(22) PCT Filed: Sep. 17, 2013

(86) PCT No.: PCT/IB2013/058610
§ 371 (c)(1),
(2) Date: Mar. 19, 2015

(87) PCT Pub. No.: WO2014/045196
PCT Pub. Date: Mar. 27, 2014

(65) Prior Publication Data
US 2015/0257581 A1    Sep. 17, 2015

(30) Foreign Application Priority Data

Sep. 21, 2012 (EP) .................................... 12185372

(51) Int. Cl.
*A47J 42/46* (2006.01)
*A47J 31/40* (2006.01)
(Continued)

(52) U.S. Cl.
CPC ............. *A47J 31/407* (2013.01); *A47J 31/42* (2013.01); *A47J 42/38* (2013.01); *A47J 42/46* (2013.01); *A47J 42/50* (2013.01)

(58) Field of Classification Search
CPC .......... A47J 31/407; A47J 31/42; A47J 42/50; A47J 42/46; A47J 42/38
See application file for complete search history.

(56) References Cited

U.S. PATENT DOCUMENTS 6,655,260 B2 * 12/2003 Lazaris ............... A47J 31/0668
                                                                99/295
7,201,098 B2 *  4/2007 Wang ..................... A47J 31/42
                                                                99/286

(Continued)

FOREIGN PATENT DOCUMENTS

DE       2926389 A1    1/1981
EP       0921605 A1    6/1999
(Continued)

*Primary Examiner* — Sean Michalski

(57) ABSTRACT

The invention relates to a beverage producing machine (1) comprising a housing (3) and a connector (20) for attaching an ingredient container (C) to said housing. The connector comprises a bottom wall (23) with a passage (25) for dispensing said ingredient towards the interior of the housing and a locking seat for said ingredient container. The locking seat comprises a ridge member (29) at least partly surrounding the bottom wall, wherein at least one resilient element (47, 49) is provided in said locking seat and constrained to the ridge member. The ridge member (29) is provided with at least one tangentially extending slot (39, 41) with an edge (39A, 41A) extending substantially parallel to and distanced from the bottom wall. The at least one resilient element projects from the edge of the slot towards the bottom wall (23) and is arranged to reduce backlash between an ingredient container and said connector when said ingredient container is locked to said connector.

15 Claims, 5 Drawing Sheets

(51) Int. Cl.
*A47J 42/38* (2006.01)
*A47J 31/42* (2006.01)
*A47J 42/50* (2006.01)

(56) References Cited

U.S. PATENT DOCUMENTS

| | | | |
|---|---|---|---|
| 8,535,743 B2* | 9/2013 | Kamerbeek | A47J 31/368 426/77 |
| 8,783,164 B2* | 7/2014 | Tanja | A47J 31/42 222/185.1 |
| 8,794,557 B2* | 8/2014 | Wu | A47J 42/38 241/169.1 |
| 9,351,602 B2* | 5/2016 | Icardi | A47J 31/3633 |
| 2004/0155130 A1* | 8/2004 | Wang | A47J 42/46 241/169.1 |
| 2008/0095904 A1* | 4/2008 | Sullivan | A47J 31/32 426/431 |
| 2013/0026269 A1* | 1/2013 | Pai | A47J 42/40 241/169.1 |
| 2015/0157166 A1 | 6/2015 | Van Os | |

FOREIGN PATENT DOCUMENTS

| | | |
|---|---|---|
| EP | 2436288 A2 | 2/2011 |
| JP | 55053032 U | 10/1978 |
| JP | 07159858 A | 2/1993 |
| JP | 2004307011 A | 11/2004 |
| JP | 2010117571 A | 5/2010 |

\* cited by examiner

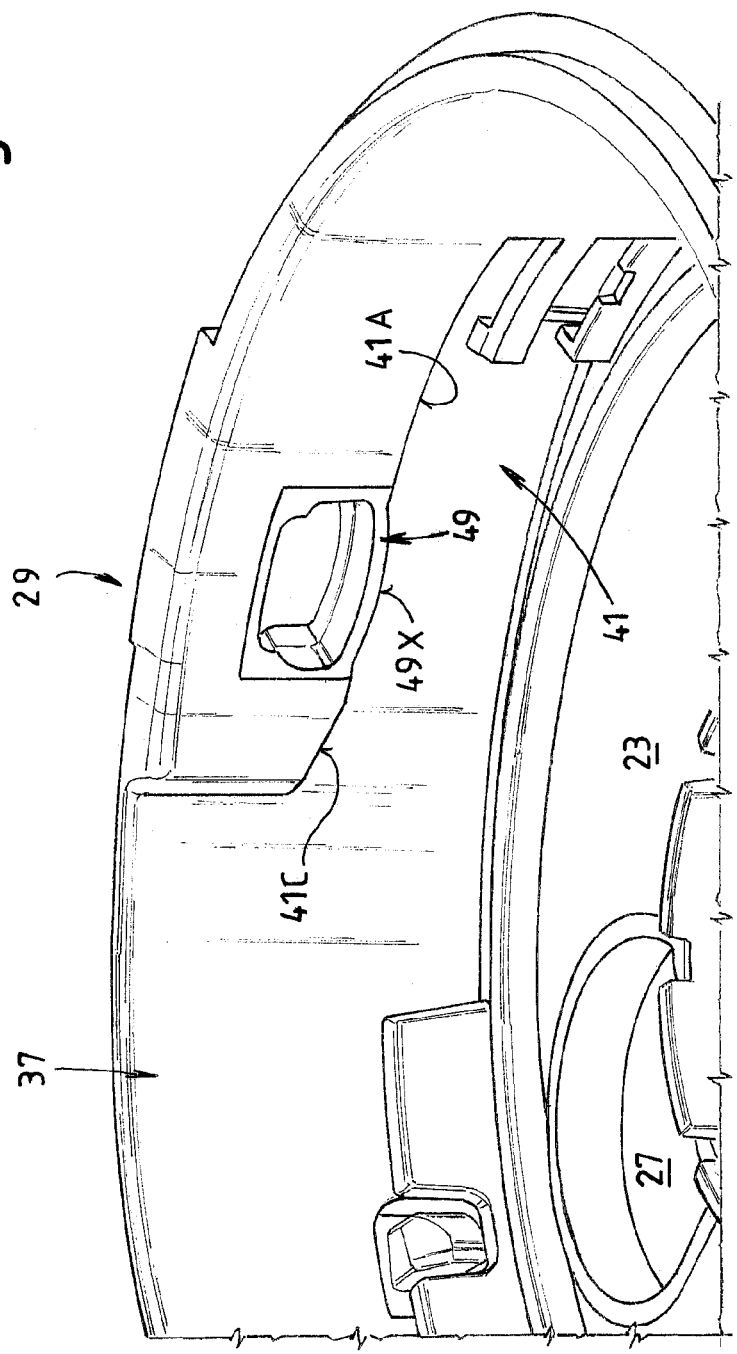

BEVERAGE PRODUCING MACHINE WITH A CONNECTOR FOR A REMOVABLE INGREDIENT CONTAINER

This application is the U.S. National Phase application under 35 U.S.C. §371 of International Application No. PCT/IB2013/058610, filed on Sep. 17, 2013, which claims the benefit of European Application No. 12185372.5 filed on Sep. 21, 2012. These applications are hereby incorporated by reference herein.

FIELD OF THE INVENTION

The present disclosure relates to beverage producing machines. Some embodiments of the present disclosure specifically relate to coffee machines, in particular coffee machines equipped with a removable, possibly disposable, coffee-beans container and provided with a coffee grinder.

DESCRIPTION OF THE RELATED ART

Coffee machines are known, including a coffee-beans container, a coffee grinder and an infusion unit. The coffee grinder is activated upon start of an infusion cycle to grind coffee beans and produce the required coffee powder for the preparation of freshly brewed coffee. In some known machines the coffee beans are packaged in a container which forms part of the machine and might be integrally formed inside the housing of the machine.

In other machines the coffee beans are contained in a removable coffee-bean container, which can be attached to the machine and can be disposable. An example of a machine comprising a removable and disposable coffee-beans container that can be connected by the consumer to the machine is disclosed in EP-A-2436288.

Coffee-beans containers of this kind are usually made of molded plastic and can be manufactured with rather coarse tolerances. This can lead to some difficulties when connecting the coffee-beans container to the machine. In some instances the coffee-beans container can house a metering and dispensing mechanism, which is acted upon by an actuator shaft housed in the machine. In this case, coarse tolerances of the coffee-beans container can lead to difficulties in connecting the metering and dispensing device with the actuating shaft.

SUMMARY OF THE INVENTION

The present invention relates to beverage producing machines, such as (but not limited to) coffee making machines provided with an external coffee-beans container, for example a disposable coffee-beans container, which overcomes or at least alleviates at least one of the problems of the prior art machines. The invention is defined in claim 1. Additional advantageous features of embodiments of the invention are set forth in the dependent claims.

According to the present invention, a beverage producing machine is provided, comprising a housing and a connector for attaching a removable ingredient container to said housing, e.g. a disposable ingredient container, such as a coffee-beans container, wherein the said connector comprises a bottom wall with a passage or aperture for dispensing at least one ingredient towards the interior of the housing. The connector further comprises a ridge member at least partly surrounding the bottom wall and forming a locking seat for the ingredient container. In some embodiments the ridge member can have an annular shape. Moreover, advantageously at least one resilient element is provided in the locking seat and constrained to the ridge member. More specifically the ridge member is provided with at least one tangentially extending slot with an edge extending substantially parallel to and distanced from the bottom wall. The resilient element projects from the edge of the slot towards the bottom wall. The resilient element is arranged and configured to reduce backlash, i.e. the mechanical play, between the connector and an ingredient container, when the ingredient container is locked to the connector. In practical terms, by projecting from the edge of the slot towards the bottom wall, the resilient element urges a container or a part thereof into pressure contact with the bottom wall. Dimensional or geometrical tolerances of the container with respect to a design shape and dimension are compensated by a variable degree of elastic deformation of the resilient member, so that mechanical play or backlash is reduced or eliminated.

In some embodiments the resilient element can be housed inside the ridge member, e.g. in a seat formed along the extension of the ridge member. In other embodiments the resilient element can be formed integrally with the ridge member, e.g. it can be molded as one piece with the ridge member.

The resilient element compensates for possible defects and/or coarse tolerances of the ingredient container. The resilient element is dimensioned such that it will resiliently act upon the ingredient container and maintain the latter in the correct locked position even if the ingredient container dimension and/or shape are slightly differing from the design dimension and shape, e.g. due to molding difficulties or manufacturing defects. More specifically, the resilient element can be designed so as to spring-load the ingredient container in the worst condition, i.e. when the dimension of the ingredient container is smaller than the design dimension. If (e.g. due to molding problems) the ingredient container is larger than it has been designed, the difference in dimension or shape can be compensated by the resilient element which is squeezed or compressed upon locking of the ingredient container in the locking seat.

In some exemplary embodiments the ridge member is annularly shaped. In one embodiment the ridge member can form a bayonet-type locking mechanism for the ingredient container. A bayonet-type locking mechanism is one where the container is locked by means of an insertion movement into the ridge member and subsequent rotation around a container axis, so that tabs, appendages or projections provided on the container and preferably near the outlet aperture thereof, engage into slots formed in the ridge member. Each slot can develop tangentially around an inner wall of the ridge member. A resilient element is arranged in each slot in order to act upon the respective tab, appendage or projection of the ingredient container. The resilient elements can be arranged to generate a downwardly oriented force, pressing on the container tabs, projections or appendages and forcing the ingredient container against the bottom wall which is at least partly surrounded by the ridge member. Especially in case of a bayonet-type locking mechanism, the ridge member can be in the form of a preferably circular annular member.

In other embodiments the ingredient container can be locked to the machine by means of a different locking or connection system, e.g. involving a vertical insertion movement only or a horizontal insertion movement, by means of which tabs, projections or appendages of the ingredient container are fitted in slots provided in a ridge which only partly surrounds the locking seat for the ingredient container.

The ridge member can be provided with preferably two or more slots and a corresponding number of resilient elements, each acting upon a tab, appendage or projection provided on the outer surface of the ingredient container.

For example, two resilient elements can be arranged in two approximately opposite positions around said ridge member. This provides a uniform pressing force being exerted on the coffee-beans container.

The use of resilient elements acting upon projections, tabs or appendages extending from the ingredient container ensures that the ingredient container is properly locked into position even if the location of the tabs, projections or appendages with respect to the bottom edge of the ingredient container, i.e. the one facing the bottom wall of the connector, does not correspond to the correct design position. Coarse tolerances on said position and/or on the thickness of the tabs, projections or appendages are compensated by the resilient elements.

In some embodiments the ridge member is provided with at least one tangentially extending slot and preferably with two such slots, e.g. arranged in approximately opposite positions along the ridge member. Each slot can be provided with an edge extending substantially parallel to and distanced from the bottom wall. In some exemplary embodiments at least one resilient element is arranged in each said slots so as to project from the edge of the slot towards the bottom wall. The resilient element(s) is(are) thus safely housed in the seat and do not form projecting parts which might hurt the user. Only a portion thereof projects downwardly from the seat, where the tab, projection or appendage of the ingredient container is introduced when the ingredient container is engaged to the connector.

In some embodiments, the ridge member can be provided with an inner wall and an outer wall, radially distanced from one another. Along the inner wall one or more indentations are provided. Each indentation can extend from an upper edge or rim of the ridge member towards the bottom wall of the connector. The resilient elements can be arranged between the inner wall and the outer wall. The indentations are intended for the insertion of the tabs, projections or appendages provided on the external wall of the ingredient container. Each indentation can merge with or extend into a respective slot extending tangentially therefrom in the direction of a rotation performed by the ingredient container for connection to the connector. The tabs of the ingredient container are thus introduced in the indentations with a translation movement along the axis of the ingredient container. Once the ingredient container has reached a final axial position, it can be rotated by say 10-40°. This range of values is by way of example only and does not limiting the scope of the present disclosure. The rotation brings the tabs into engagement with the tangential slots provided in the inner wall of the ridge member and into contact with the resilient members which are arranged so as to project downwardly towards the bottom wall of the connector. The tabs, appendages or protrusions press against the resilient elements and the ingredient container is thus maintained safely into press-engagement with the bottom wall.

In some embodiments, a chamfer or bevel can be provided between the indentation and the relevant slot, said chamfer being inclined towards the bottom wall of said connector and from the indentation towards said slot. The bevel or chamfer facilitates the insertion of the tab, protuberance or appendage of the ingredient container into the relevant slot and under the resilient element.

For a more reliable action and longer duration of the resilient elements, the latter can be made of a metallic material, e.g. steel. In other embodiments the resilient elements can be made of plastic material, reinforced-plastic material or the like. Each resilient element can e.g. be formed by a folded metal sheet. The metal sheet can be folded in the shape of a single or double spring. For example the resilient element can be formed by a generally U-shaped metal sheet having a central portion and two legs. The legs can be provided with folds, which impart the required resiliency and elastic properties to the resilient element. In some embodiments the central portion of the resilient element can have a generally curved profile with a convex side preferably facing the bottom wall of the connector. Curved profile shall be intended as a profile which is non-rectilinear. For example, a curved profile can be formed by portions of sequentially arranged and suitably oriented straight segments.

The ridge member can be made of plastic material, e.g. molded plastic material. The resilient elements can compensate also for manufacturing tolerances of the ridge member. High manufacturing precision is not required, since the actual locking action on the ingredient container is not generated by the molded-plastic ridge member, but rather by the (preferably metallic) resilient elements housed therein.

In some exemplary, non-limiting embodiments a dispensing or metering actuator can be arranged at the bottom wall. The dispensing or metering actuator can be comprised of a metering shaft. The shaft can e.g. be driven into rotation by an electric motor arranged in or at the machine housing, for instance under the bottom wall of the ingredient-container connector. The use of resilient elements pressing the ingredient container in the correct position ensures correct engagement between the shaft and dispensing or metering means provided in, or supported by the container. In other embodiments, dosing or metering means can be arranged in a different position, e.g. below the connector.

In some embodiments, a sensor, e.g. a micro switch, can be provided for detecting the presence and/or the position of an ingredient container in said connector. The sensor can be used to enable the operation of the beverage preparing machine only if the sensor detects that an ingredient container has been correctly introduced and locked in the connector. The sensor can be arranged near the ingredient container position. In some exemplary embodiments the sensor can be attached to or housed in the ridge member of the connector. In yet other embodiments the sensor can be arranged at or in the bottom wall of the connector. Hall-effect sensors or capacitive sensors can also be used, which could be arranged in a different position, e.g. under the bottom wall of the connector.

The present disclosure also concerns a system comprising a beverage producing machine as described above and one or more ingredient containers, e.g. of disposable type. Each ingredient container of the system can be provided with appendages, projections or tabs for a bayonet-type engagement in the locking seat or socket. Other connection or locking members can be provided, instead, for connection with the connector of the beverage producing machine. The locking members are designed for co-acting with one or more resilient elements arranged in the connector. In other embodiments the ingredient container can be provided with resilient elements attached thereto and co-acting with the connector or parts thereof.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 8 illustrates a detail of a different embodiment of the resilient element.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description reference will specifically be made to coffee-beans containers, to a coffee machine and to a beverage producing unit in the form of a brewing unit comprising a brewing chamber. It shall however be understood that at least some of the features disclosed herein can be embodied in a beverage producing machine intended for the preparation of a different beverage, still using bulk ingredients contained in an ingredient container, for example in the form of powder, leafs etc. and including a beverage producing unit with an infusion chamber, different from a brewing unit.

Figure 1:
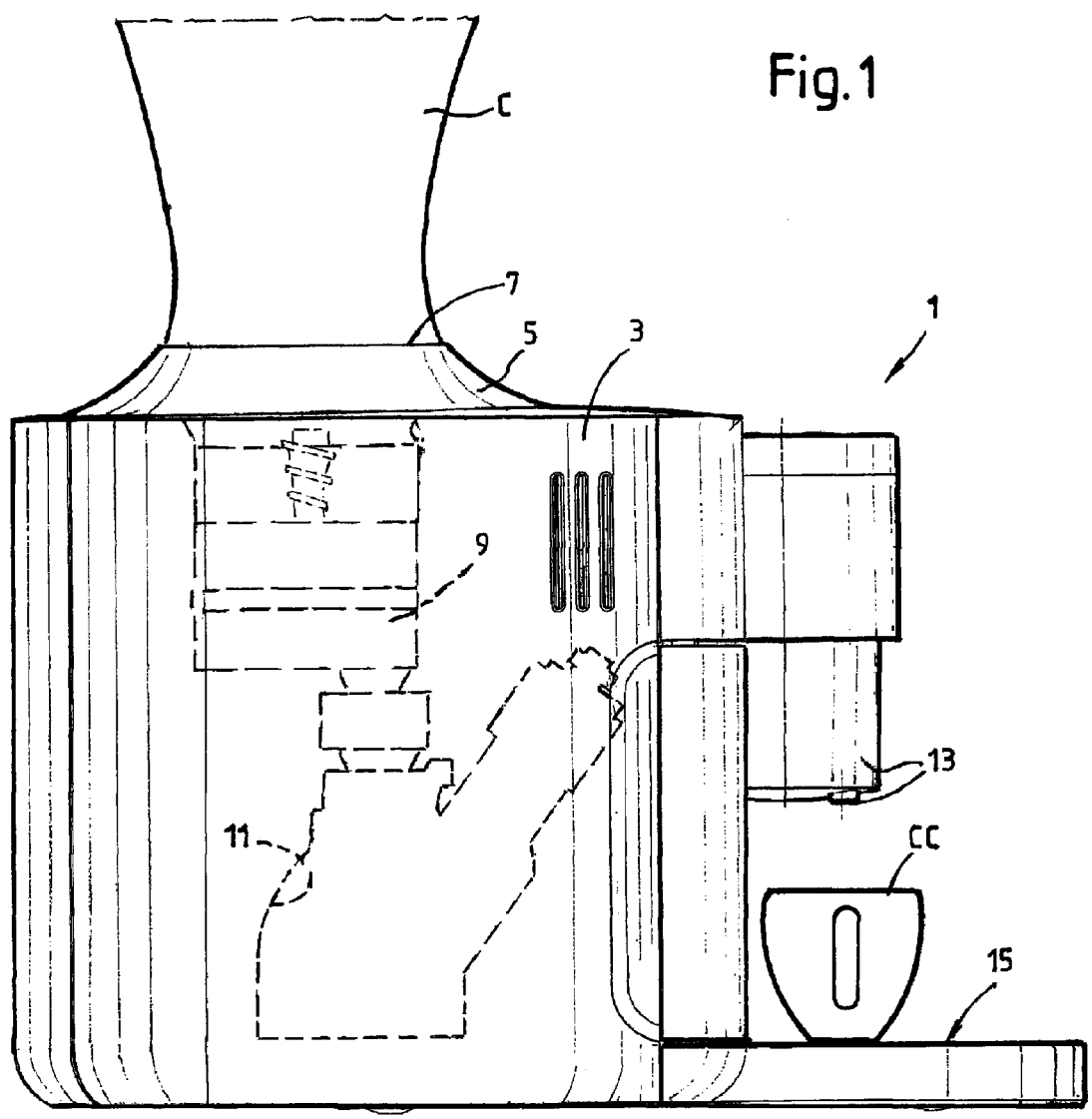
FIG. 1 illustrates a side schematic view of a coffee machine embodying the invention.
Figure 2:
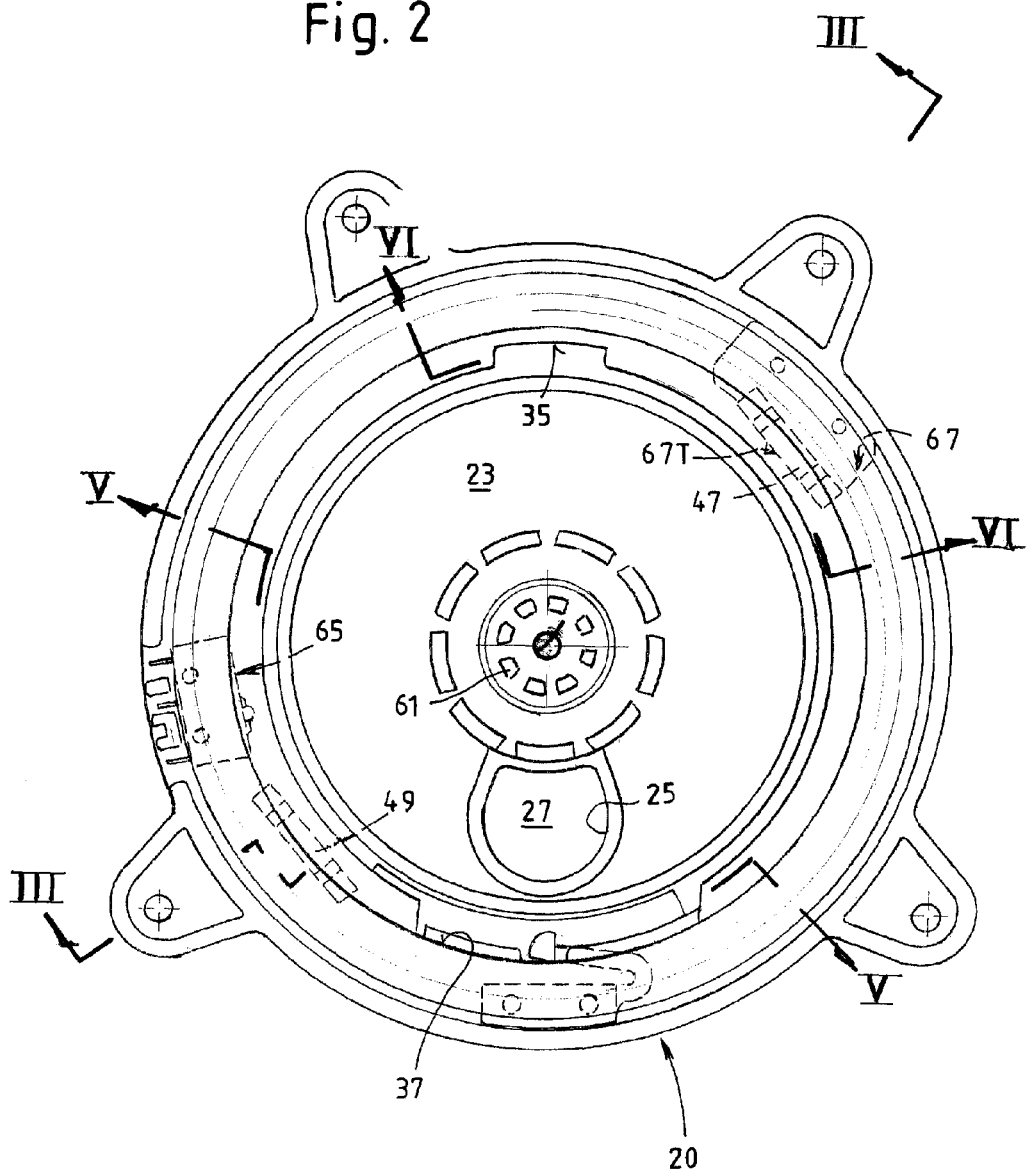
FIG. 2 illustrates a plan view of the connector for interfacing a coffee-beans container to the coffee machine of FIG. 1.

FIG. 1 illustrates a side view of a coffee machine. The coffee machine 1 includes a housing 3 with a top ceiling 5 having a seat 7 in which a coffee-beans container C can be introduced and engaged with the outlet opening of the coffee-beans container C oriented downwardly in order to dispense coffee beans to a coffee grinder 9 arranged inside the housing 3 of the machine 1. The grinder 9 grinds coffee beans delivered therein from the coffee-beans container to produce ground coffee powder, which is then dispensed to a brewing unit 11, also housed in the housing 3 of the coffee machine 1. The grinder 9 and the brewing unit 11 are known per se and will not be described in great detail herein.

The machine 1 also includes a coffee dispensing spout 13 placed above a drip tray closed by a grid 15, on which a coffee cup CC or another suitable beverage container can be placed, such as a glass, a bowl or the like, for collecting the beverage dispensed by the dispensing spout 13.

In some embodiments the coffee-beans container C can be a removable and disposable package. The coffee-beans container C can be connected by the user to the coffee machine and replaced once it is empty, i.e. when the coffee beans contained in the coffee-beans container have been entirely used. A coffee-beans container of this kind is disclosed in EP-A-2436288.

A connector for connecting the coffee-beans container C to the machine 1 is housed in the seat 7. FIGS. 2 through 7 illustrate the features of the connector. For a better understanding of the structure of said connector, the latter is shown in isolation, the surrounding machine components and elements having been removed.

The connector is labeled 20. In some exemplary embodiments the connector 20 comprises a bottom wall 23, wherein an aperture 25 is provided. The aperture 25 can be selectively opened and closed by means of a shutter 27, for example a sliding shutter housed within or underneath the bottom wall 23.

The connector 20 is further comprised of ridge member 29, surrounding the bottom wall 23 and forming a socket into which the coffee-beans container C can be introduced and locked. In some embodiments the ridge member 29 is in the form of an annular member, of approximately circular shape, as shown in the attached drawings. Here below, the ridge member 29 will also be referred to as annular member 29. The coffee-beans container C can be locked with a suitable locking mechanism or device between the bottom wall 23 and the ridge member 29.

Locking of the coffee-beans container C within the socket formed by the annular member 29 and the bottom wall 23 can be obtained by means of a bayonet type locking system.

Figure 3:
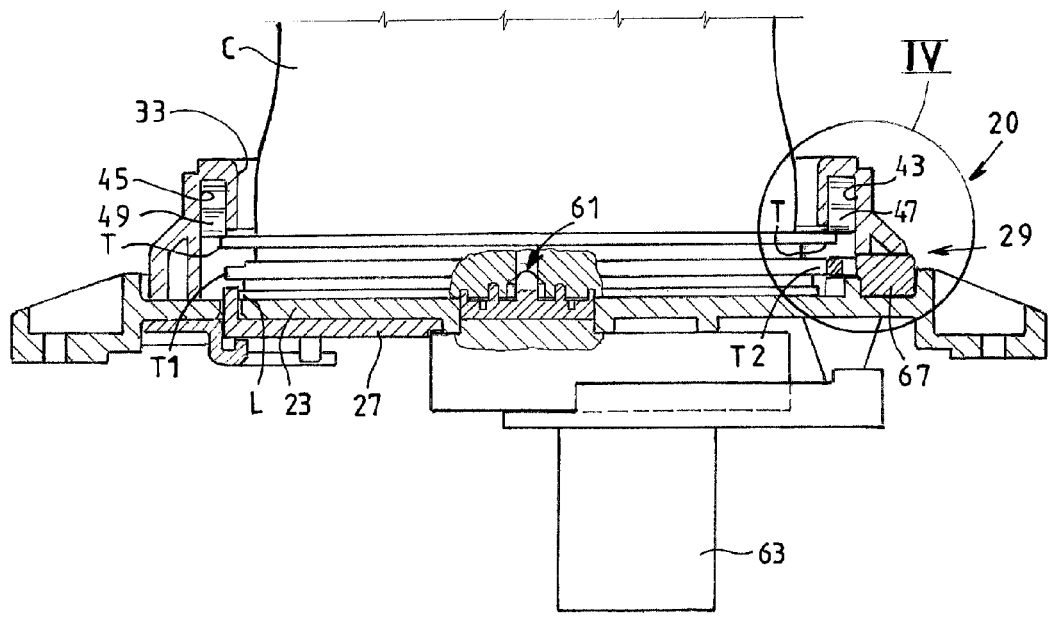
FIG. 3 illustrates a section according to line III-III in FIG. 2.

As shown for example in FIG. 3, the coffee-beans container C can be provided with generally diametrically opposite tabs T, designed to co-act with slots formed in the annular member 29.

Figure 5:
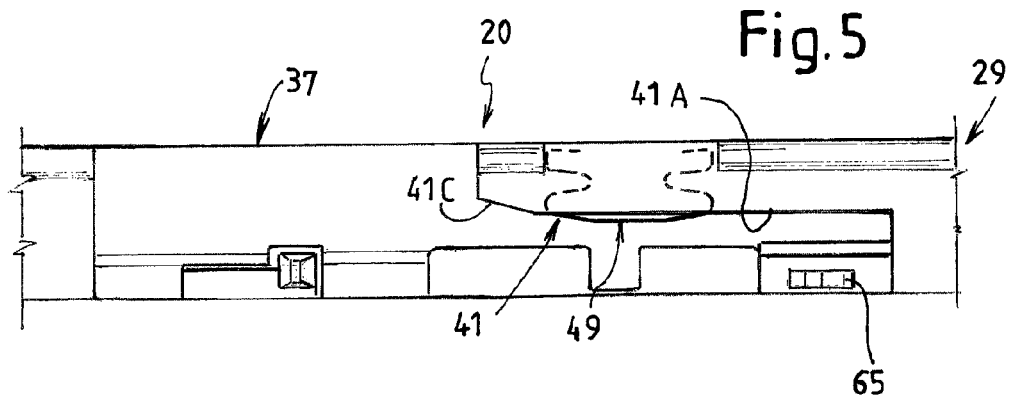
FIGS. 5 and 6 illustrate plan developments of views according to lines V-V and VI-VI in FIG. 2.
Figure 6:
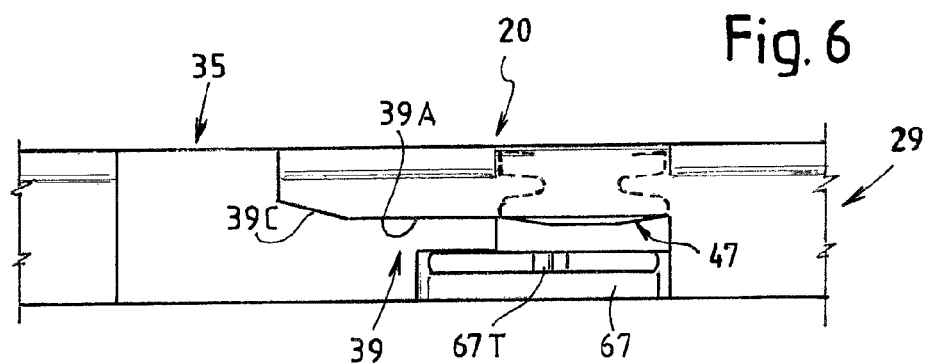

The annular member 29 comprises a top or upper rim or edge 31 from which an inner wall 33, radially distanced from an outer wall of the annular member 29, develops towards the bottom wall 23. In two approximately opposing positions the inner wall 33 is provided with respective indentation 35 and 37. The indentation 35 and 37 are best shown in FIGS. 5 and 6. The two indentations 35 and 37 can have different widths in the tangential direction, corresponding to different tangential lengths of the tabs T of the coffee-beans container C.

One side of each indentation 35, 37 a respective slot 39, 41 is formed in the inner wall 33 of the annular member 29. The two slots 39, 41 have a tangential development, i.e. they extend around the annular member 29, and are each provided with a respective edge 39A and 41A, distanced from the bottom wall 23 and approximately parallel thereto.

Figure 4:
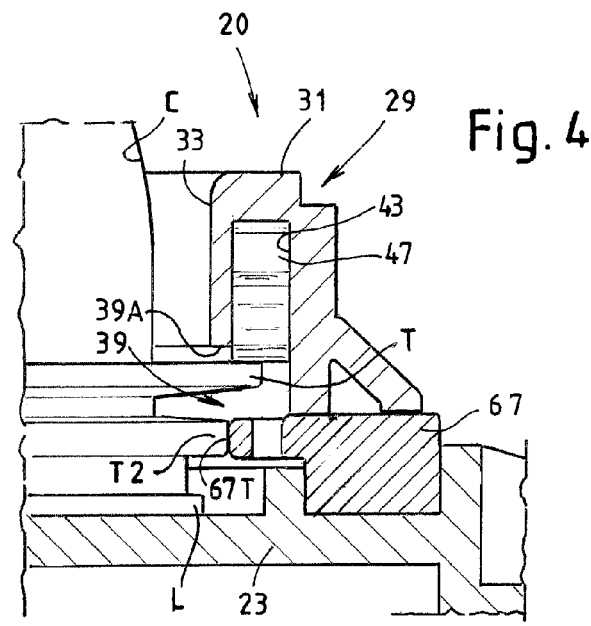
FIG. 4 illustrates an enlargement of a detail in FIG. 3.

At each slot 39, 41 the annular member 29 forms a seat 43, 45 for a respective resilient element 47, 49. The seats 43, 45 extend above the edges 39A, 41A and are opened towards the bottom wall 23. Each resilient element 47, 49 is dimensioned such as to slightly project downwardly towards the bottom wall 23 from the respective seat 43 and 45. As can be seen for example in the enlargement of FIG. 3, each resilient element 47, 49 projects therefore from the edge 39A, 41A of the respective slot 39, 41 formed in the annular member 29. As shown in FIG. 4, each resilient element 47, 49 is arranged between the radially inner wall 33 and the radially outer wall of the annular member 29.

In some exemplary embodiments, the edges 39A and 41A have a beveled or chamfered portion (see in particular FIGS. 5 and 6) shown at 39C and 41C. The chamfered portions 39C, 41C are inclined towards the bottom wall 23 and from the respective indentation 35, 37 towards the corresponding slots 39, 41.

The coffee-beans container C can be engaged to the connector 20 by introducing the respective tabs T into the indentation 35 and 37 with a vertical movement of the coffee-beans container towards the inside of the annular member 29 and by subsequently rotating the coffee-beans container C around the axis thereof until the tabs T engage into the slots 39 and 41. The chamfered portion 39C, 41C of the edges 39A and 41A make the rotation of the coffee-beans container C easier and provide guidance for the tabs T underneath the edges 39 and 41. The insertion of the tabs T into the slots 39 and 41 causes the tabs T to press against the resilient elements 47, 49, which project downwardly beyond the edges 39A, 41A of the slots 39, 41.

In this way, even coarse tolerances in the manufacturing of the coffee-beans container C can be compensated by the resilient elements 47, 49, allowing a correct insertion and engagement of the coffee-beans container C into the connector 20.

The annular member 29 can be dimensioned such that the edges 39A and 41A of the two slots 39 and 41 do not co-act with the tabs T of the coffee-beans container C, those tabs only contacting and pressing against the resilient element 47, 49.

In some embodiments the resilient element 47, 49 are each formed by a bent laminar member, for example a metallic sheet, such as steel.

Figure 7:
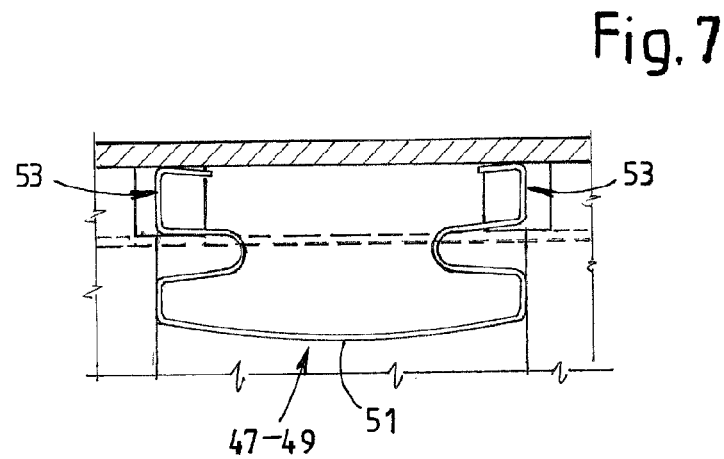
FIG. 7 illustrates one of the seats where the resilient elements are housed with part removed therefrom, showing the shape of the resilient element in one possible embodiment.

As can best be seen in FIG. 7, each resilient element 47, 49 can be broadly U-shaped with a central portion 51 and two side portions or leg portions 53. The central portion 51 is preferably curved downwardly, with a convex side facing the bottom wall 23 and the concave side facing upwardly towards the top edge 31 of the annular member 29. Preferably the leg portions 53 are bent to provide a spring action.

Each resilient element 47, 49 is housed in the respective seat 43, 45 with the ends of the leg portion 53 contacting the ceiling or top wall of the respective seats 43, 45 and the curved lower central portion 52 at least partly projecting downwardly beyond the edges 39A, 41A of the slots 39, 41, towards the bottom wall 23.

Optimal resilient deformation of the resilient element 47, 49 is thus obtained when the coffee-beans container C is engaged with the tabs T being introduced into the slots 39, 41 by turning the coffee-beans container around the container axis.

In some embodiments, a rotating shaft 61 extends through the bottom wall 23 for engagement with a dispensing mechanism arranged inside the coffee-beans container C, as known in the art. The shaft 61 can be controlled into rotation by a motor 63 supported in the housing 3 and in particular, preferably by the bottom wall 23. The shaft 61 can have a frontal set of teeth engaging with corresponding actuating means arranged in the coffee-beans container C and not shown in detail. When the coffee-beans container C is properly engaged to the connector 20, the motor 63 can be energized upon command by the user, to dispense a metered amount of coffee beans from the coffee-beans container C through the aperture 25 towards the grinder 9, when the sliding shutter 27 is in the open position, said open position being obtained for example by co-action between the coffee-beans container C and a mechanical opening and closing member associated with the sliding shutter 27, and not shown.

In some embodiments, in order to detect the correct engagement and positioning of the coffee-beans container C in the connector 20, a sensor can be housed within the annular member 29. In some embodiments, see in particular FIG. 5, a micro-switch 65 can be housed inside the annular member 29. The micro-switch 65 or any other suitable sensor can be advantageously housed near one of the slots 39, 41. The micro-switch 65 can be acted upon by one of the tabs T of the coffee-beans container or by an additional tab T1 or T2 (see in particular FIGS. 3 and 4) arranged between the tabs T and the lower edge L of the coffee-beans container C, said lower edge L contacting the bottom wall 23 when the coffee-beans container C is correctly engaged with the connector 20.

In some embodiments one or more latches 67 can further be housed within the annular member 29. In some embodiments one latch 67 can be provided with a tip 67T co-acting with the side surface of the coffee-beans container C and/or with one of the tabs T, T1, T2, projecting there from. As can best be seen in FIGS. 3 and 4 in the exemplary embodiment shown herein the latch 67 is arranged in a position approximately corresponding to the position of the resilient element 47 and approximately opposite the micro-switch 65.

Different positions for the latch 67 and for the micro-switch 65 are possible, depending upon the shape and design of the coffee-beans container C and of the position of the tabs T, T1 and T2 thereof. Additional latch members can be housed in different angular positions along and within the annular member 29.

FIG. 8 illustrates a perspective view of a detail of the annular or ridge member 29 in a different embodiment. A resilient element 49 is illustrated in FIG. 8. In this embodiment the resilient element 49 can be made of a molded plastic component. The plastic component can be in the form of a frame with a resiliently deformable side 49X. The side 49X can project downwardly from the edge 41A of the slot 41. A similar arrangement is provided for the opposite slot 39. The frame forming the resilient element 49 can be forcedly engaged in a seat formed in the annular member 29.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A beverage producing machine comprising a housing and a connector for attaching an ingredient container to said housing, said connector comprising: a bottom wall with a passage for dispensing said ingredient towards the interior of the housing; and a locking seat for said ingredient container, the locking seat comprising a ridge member at least partly surrounding the bottom wall; wherein at least one resilient element is provided in said locking seat and constrained to the ridge member; wherein the ridge member is provided with at least one tangentially extending slot with an edge extending substantially parallel to and distanced from the bottom wall, said at least one resilient element projecting from the edge of the slot towards the bottom wall; said resilient element being arranged to reduce backlash between an ingredient container and said connector when said ingredient container is locked to said connector.

2. Machine according to claim 1, wherein said at least one resilient element is housed in the ridge member.

3. Machine according to claim 1, wherein said ridge member has an annular shape.

4. Machine according to claim 1, wherein said locking seat forms a bayonet-type locking mechanism for said ingredient container.

5. Machine according to claim 1, comprising two resilient elements arranged in two positions approximately opposite to one another in said locking seat.

6. Machine according to claim 1, wherein said ridge member comprises: an inner wall extending from an upper edge towards the bottom wall, said inner wall being provided with at least one indentation extending from said upper edge of said ridge member towards said tangentially extending slot.

7. Machine according to claim 6, wherein said ridge member further comprises a radially outer wall distanced from said radially inner wall and wherein the at least one resilient element is positioned between the inner wall and the outer wall of the ridge member.

8. Machine according to claim 6, wherein a chamfer is provided between said indentation and said slot.

9. Machine according to claim 1, wherein said at least one resilient element is made of metal and is housed in a seat formed in the ridge member, said ridge member being made of plastic.

10. Machine according to claim 1, wherein said at least one resilient element is housed in a respective seat formed in the ridge member, said ridge member being made of plastic material.

11. Machine according to claim 1, wherein a dispensing actuator is arranged at said bottom wall, said dispensing actuator co-acting with an ingredient container attached to said connector for dispensing a beverage ingredient through said passage in said bottom wall.

12. Machine according to claim 1, comprising a sensor housed in said ridge member, for detecting presence and/or position of an ingredient container in said connector.

13. Machine according to claim 1, comprises a latch member co-acting with an ingredient container inserted and locked in said connector.

14. Machine according to claim 1, wherein said ingredient is coffee in form of coffee beans and said machine is a coffee machine.

15. A system comprising a beverage producing machine according to claim 1, and an ingredient container connectable to and disconnectable from said connector.

* * * * *